Dec. 15, 1931.  W. C. STARKEY  1,836,199
CLUTCH
Filed June 13, 1927   2 Sheets-Sheet 1

Inventor
WILLIAM CARLETON STARKEY,

By
Attorneys

Dec. 15, 1931.  W. C. STARKEY  1,836,199
CLUTCH
Filed June 13, 1927  2 Sheets-Sheet 2

Inventor
WILLIAM CARLETON STARKEY,
By Schley Trask
Attorney

Patented Dec. 15, 1931

1,836,199

UNITED STATES PATENT OFFICE

WILLIAM CARLETON STARKEY, OF INDIANAPOLIS, INDIANA, ASSIGNOR TO L. G. S. DEVICES CORPORATION, OF INDIANAPOLIS, INDIANA, A CORPORATION OF INDIANA

CLUTCH

Application filed June 13, 1927. Serial No. 198,440.

It is the primary object of my invention to produce a clutch for the interconnection of two relatively rotatable members, in which clutch the torque transmitted from one member to the other will be gradually increased when the clutch is rendered operative, thus avoiding shocks due to sudden interconnection of the two relatively rotatable parts. A further object of my invention is to produce such a clutch which may be rendered operative or inoperative at will and in which the parts which move to render the clutch operative may be relatively light in weight and need not have strength sufficient to carry the entire torque transmitted between the two rotatable members.

I accomplish the above objects by providing one of the two clutch members with an axial recess, and I locate in such recess a coil spring operatively connected to the other clutch member. The clutch spring which I employ in my invention has some of its coils smaller in diameter than the walls of the axial recess above referred to, so that during the expansion of such coils into engagement with the walls of the recess a gradually increasing torque will be transmitted between the two clutch members. In the preferred form of my invention, the largest-diameter coils of the spring are made slightly smaller than the recess in which such spring is located in order that free relative rotation of the two clutch members may occur, and means are provided for interconnecting the recessed member with the adjacent end of the coil spring so as to render such spring operative to clutch the two clutch members together.

Figure 1:
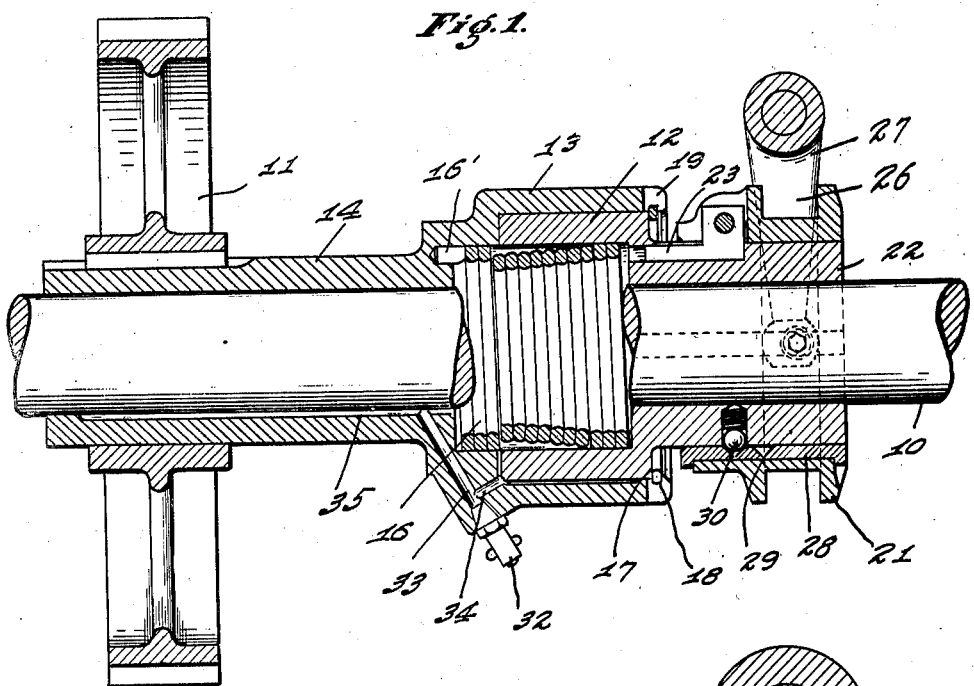
Figure 2:
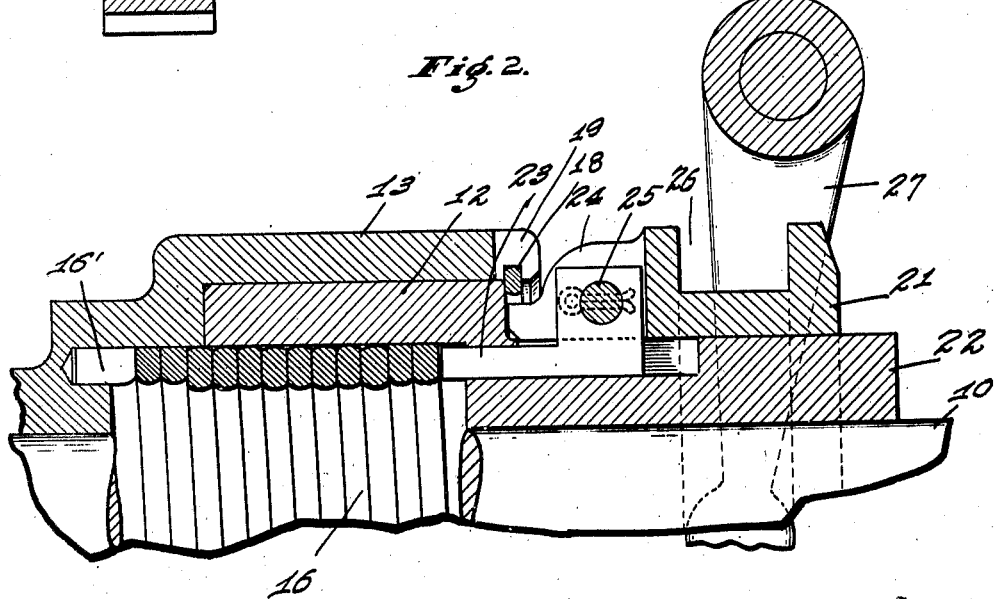
Figure 3:
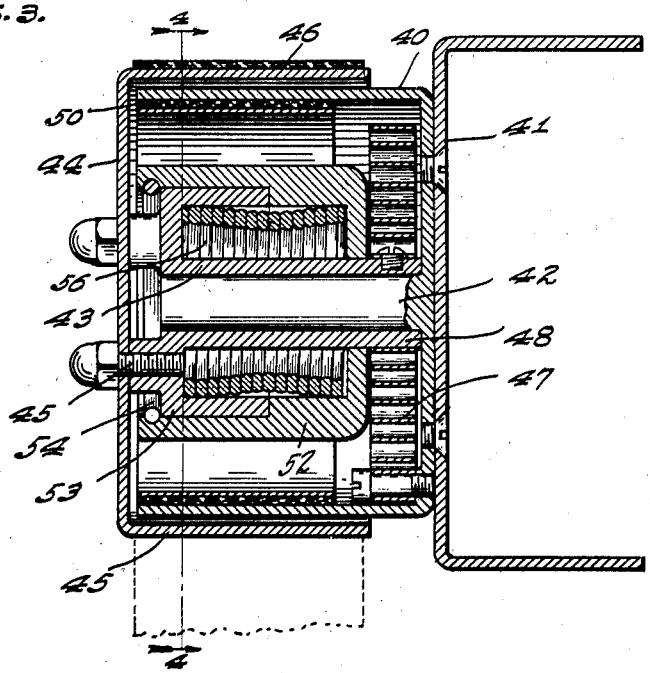
Figure 4:
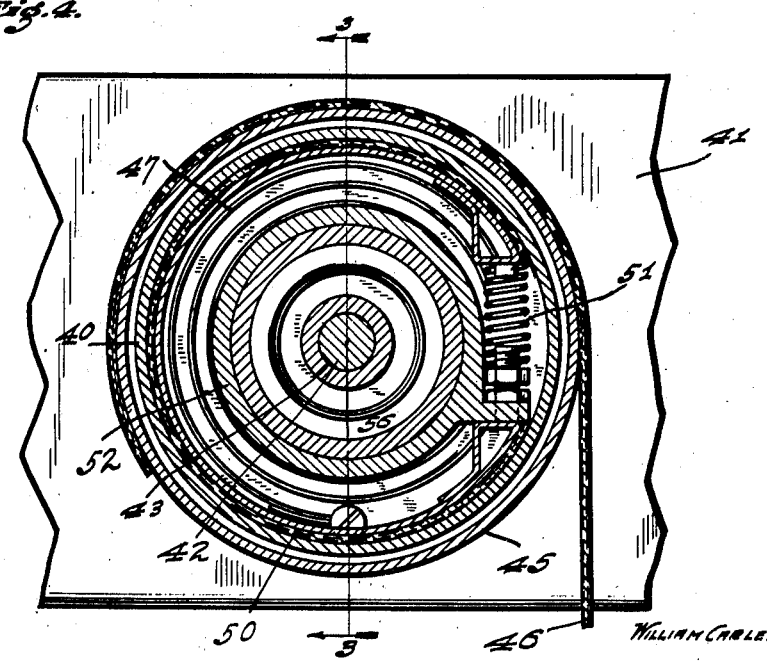

The accompanying drawings illustrate my invention: Fig. 1 is a longitudinal section through a clutch showing the parts in the potion they occupy when the clutch is inoperative; Fig. 2 is a fragmental section similar to Fig. 1 but with the parts shown in the position occupied when the clutch is operative; Fig. 3 is a longitudinal section on the line 3—3 of Fig. 4 through a shock-absorbing device embodying a form of spring which my invention contemplates; and Fig. 4 is a transverse section on the line 4—4 of Fig. 3.

As shown in Figs. 1 and 2 of the drawings, my invention is embodied in a disengageable clutch adapted for use in the interconnection of a shaft 10 and a gear 11. This showing is merely illustrative, as my invention is capable of use in other situations.

In the construction illustrated in Figs. 1 and 2, two clutch members 12 and 13 are provided. The clutch member 12 is rigidly secured to the shaft 10, while the clutch member 13 is rotatable relatively to such shaft and is provided with an extended hub 14 on which the gear 11 is rigidly mounted.

The clutch member 13 is preferably constructed in the form of a cup counter-bored to receive the clutch member 12 which is provided with an axial cylindrical recess. In this recess in the clutch member 12 I provide a coil spring 16 which may have one of its ends connected to the clutch member 13 in order that it may rotate therewith.

Desirably, the bottom of the cup 13 is recessed for the reception of the last few turns of the spring 16, such recess and the recess of the cup 12 being of substantially equal diameter in order that their walls will form a substantially continuous cylindrical surface. For the purpose of positively interconnecting the clutch member 13 and spring 16, the extreme end 16' of the spring may be bent axially outward and received within a hole in the bottom of the clutch member 13.

To hold the two clutch members 12 and 13 in definite axial relation, the clutch member 12 may be provided within the counter-bored portion of the clutch member 13 with a shoulder 17 adapted to be engaged by a split spring ring 18 received in an annular groove in the wall of such counter-bored portion. If desired, several slots 19 may be provided at spaced circumferential intervals in the end of the clutch member 13 to assist in the insertion and removal of the ring 18.

As stated above, some of the turns of the clutch spring 16 are made smaller in diameter than the recesses in which the spring is located in order to provide for a gradual increase in the torque transmitted between the two clutch members 12 and 13 when the clutch is rendered operative. For reasons which will appear later, it is desirable that the last few spring-turns which co-operate with the clutch member 12 have a diameter only slightly less than that of the recess in such clutch member in order that only a slight torque need be imposed on the spring to cause these spring turns to expand and grip the clutch member 12. Between these last spring turns and that end of the spring 16 which is connected to the clutch member 13, I provide a plurality of spring turns of considerably smaller diameter than the recess of the clutch member 12. Preferably, such spring turns are made of a gradually decreasing diameter so that this portion of the spring 16 will have a conical form tapering toward the end 16' of the spring.

At about the point where the spring enters the recess in the clutch member 13, if such recess is provided, the spring may increase in diameter as shown in Fig. 1. The spring turns located in the recess of the clutch member 13 are approximately of the same diameter as such recess. Since the coil spring always rotates with the clutch member 13, the coil turns located in the recess in such clutch member may have normally a slightly larger diameter than such recess, so that when in position in such recess they will bear against the wall thereof. If such coil turns are smaller in diameter than the recess they are preferably only slightly smaller, in order that they may expand into gripping engagement with the walls of such recess before an excessive torque is imposed upon the end 16' of the spring.

To control the operation of the spring—i. e., to render it operative or inoperative as a means for clutching the two clutch members 12 and 13 together—I may employ the mechanism illustrated in the drawings. This mechanism comprises a collar 21 which is rotatable with and axially slidable along the hub 22 of the clutch member 12. Axially slidable with the collar 21 is a key 23 which may be secured between ears 24 on the collar 21 by means of a pin 25. The key 23 projects through the bottom of the recess in the clutch member 12, and, in the movement of the collar 21, moves into or out of the path of the adjacent end of the spring 16.

To provide for axial shifting of the collar 21, it may have an annular groove 26 which receives the ends of a shifting yoke 27 adapted to be operated by any desired form of mechanism. To hold the collar 21 in either of its two controlling positions, I may provide it with an insert 28 having two spaced notches 29 which co-operate with an outwardly spring-pressed ball 30 carried by the hub 22 of the clutch member 12.

Desirably, some means is provided for effecting lubrication of the spring and other bearing surfaces of the clutch. To this end, I may mount on the clutch member 13 a lubricating fitting 32 communicating with two passages 33 and 34. The passage 33 leads to a lubricant-conducting groove 35 in the inner wall of the hub 14 of the clutch member 13, while the passage 34 communicates with axial and radial grooves in the inner surfaces of the clutch member 13, the radial groove in such clutch member communicating with the spring-receiving space.

As was pointed out above, the turns of the spring 16 which are received within the recess in the clutch member 12 are all smaller in diameter than is such recess, and the two clutch members 12 and 13, as well as the shaft 10 and gear 11 to which such clutch members are respectively connected, are free to rotate relatively to each other when the parts are in the position shown in Fig. 1. To render the clutch operative, the collar 21 is moved to the left from the position shown in Fig. 1 to the position shown in Fig. 2. If, now, the clutch members 12 and 13 are rotated relatively in a direction to cause unwinding of the spring 16, the inner end of the key 23 will be engaged by the adjacent end of the spring 16, and the unwinding torque to which the spring is thus subjected causes it to expand so that the end coils will engage the walls of the recess in the clutch member 12. If relative rotation of the two clutch members in the same direction still continues, other turns of the spring 16 will expand into gripping engagement with the inner surface of the clutch member 12. When relative rotation of the clutch members 12 and 13 has proceeded to an extent such that all the spring-turns engage the wall of the recess in the clutch member 12, the two clutch members will be positively connected together.

It is to be noted that the key 23 in operating to impose a torque on the spring 16 need transmit only a very small force, since it is relieved of further stress when the adjacent spring-turns engage the inner surface of the clutch member 12 owing to an increase in their diameter. Since such spring-turns may be made only slightly smaller than the recess, only a slight torque is sufficient to cause them to expand into engagement with the recess wall. The torque necessary to cause expansion of the smaller-diameter spring-turns may be practically entirely transmitted to the spring through the frictional engagement of the last few turns thereof with the inner surface of the clutch member 12. As each spring-turn engages the recess wall, the area of surface contact between the spring 16 and the clutch member 12 is increased, thus permitting the transmission of a greater torque from the clutch member to the spring.

In Figs. 3 and 4 of the accompanying drawings, I have illustrated my clutch as embodied in a shock absorber or snubber suitable for use on automobiles. The snubber is arranged to act between two parts of the automobile which tend to separate on rebound, such for instance as the frame and the axle.

The snubber comprises a friction brake drum 40 rigidly mounted on one of the vehicle parts such as a seat member 41 of the vehicle frame. Rigid with the brake drum 40 there is a central stud shaft 42 on which is rotatably mounted a clutch member 43 secured to a cap 44 as by means of screws 45. The cap 44 has an inwardly extending flange 45 which preferably overlies the drum 40 but is spaced therefrom as is clear from Figs. 3 and 4. The cap 45 is connected as by means of a flexible member 46 which the vehicle axle so that relative movement of the axle and frame 41 will develop in rotation of the cap.

To maintain the strap taut, I provide within the drum 40 a spring which tends to rotate the cap 44 in a counter-clockwise direction (Fig. 4). This spring may be in the form of a spiral spring 47 secured at its outer end to the drum 40 and at its inner end to the hub 48 of the clutch member 43. The spring 47 is so arranged that it tends to rotate the cap 44 to keep the strap 46 taut. From the above description, it will be evident that the cap 44 will be rotated in one direction (clockwise in Fig. 4) by the strap when the frame 41 and the part to which the lower end of the strap 46 is attached separate on rebound. When these two vehicle parts approach each other, the cap 44 will be rotated by the spring 47 in the opposite or counterclockwise direction (Fig. 4) and I take advantage of this rotation of the cap 44 to impose on the cap a force tending to prevent or decrease the extent of rebound. To this end, I provide within the drum 40 a friction brake band 50 adapted to be expanded into contact with the inner surface of the drum 40 as by means of a compression spring 51. I connect this friction brake band 50 with the cap 44 through an overrunning clutch in order that rotation of the cap 44 in a clockwise direction will be opposed by the friction between the band 50 and the drum 40, while rotation of the cap in the opposite direction under the influence of the spring 47 will not be opposed. This overrunning clutch embodies a clutch member 43 already referred to and a second clutch member 52.

The clutch member 43 may be provided with an annular cylindrical recess surrounding its hub 48, while the clutch member 52 may likewise be provided with a cylindrical recess which is preferably counterbored to receive the clutch member 43. Desirably, the clutch member 52 extends outward beyond a shoulder 53 on the clutch member 43 and is there provided in its inner surface with an annular groove adapted to receive a split spring ring 54 which bears against the shoulder 53 and serves to hold the two clutch members together.

Located within the recesses of the clutch members 43 and 52 is a clutch spring 56 which has its turns at one end engaging the clutch member 43 and those at the other end engaging the clutch member 52, so that when such clutch members tend to rotate relatively in a direction to unwind the spring it will expand into firm frictional engagement with the walls of the associated recesses to clutch the two clutch members together. Relative rotation of the clutch members in the opposite direction may freely occur, since such rotation has a tendency to wind the spring and to reduce its diameter.

The construction so far described is substantially the same as that set forth in my copending application which has matured into Patent No. 1,679,179, granted July 31, 1928. In that application, the clutch spring described was cylindrical, and it required but a very slight relative movement of the two clutch members to cause the spring to engage the walls of its associated recesses. Thus, any tendency of the frame and axle of the vehicle to separate was immediately opposed by the friction between the brake 50 and drum 40.

In the invention of this application, instead of the cylindrical spring of my earlier application, I substitute a spring somewhat similar to that shown in Figs. 1 and 2 of the drawings and previously described. In the shock absorber shown in Figs. 3 and 4, however, the spring is always in operative engagement with both clutch members instead of being capable of being freed from one of them. To this end, I so construct the spring 56 that the last turn or turns at both ends thereof have a normal diameter slightly larger than the diameter of the recesses in which the spring is located in order that when in place in such recesses they have frictional contact with the walls thereof. Between these end turns which are in frictional contact with the walls of the associated recesses, I provide a plurality of turns of smaller diameter which preferably taper toward the axial center of the spring as is clear from Fig. 3.

In the operation of the shock absorber just described, the coil spring 47 serves to keep the strap 46 taut at all times. If the axle and frame 41 approach each other, the spring 47 rotates the cap 45 and takes up any slackness in the strap. This rotation of the cap 44 is not interfered with by the brake 50, for rotation of the cap in this direction does not result in expansion of the coil spring. When, however, the axle tends to move away from the frame 41, the cap tends to rotate in a direction unwind the spring 56. At first, this rotation of the cap is opposed only by the inherent resiliency of the spring 56, the intermediate, smaller-diameter spring turns expanding to accommodate relative movement of the two clutch members. Eventually the expansion of the intermediate spring turns is arrested by their engagement with the walls of the associated recesses, and thereafter the two clutch members 43 and 52 rotate together, the clutch member 52 carrying the brake band 50 with it, and the friction between this brake band and the drum 40 opposes rotation of the cap 44.

The shock absorber just described has the advantage that no material resistance is opposed to slight rebounds, which has been found desirable in the promotion of easy riding. Upon the occurrence of a rebound greater than that necessary to expand the intermediate turns of the spring 56 into engagement with the walls of the associated recesses, the brake band 50 comes into action and opposes and decreases the extent of rebound.

I claim as my invention:—

1. In combination, two relatively rotatable members, one of said members being provided with an axial recess, and a coil spring located in said recess and operatively connected to the other of said members to be expanded into gripping engagement with the wall of said recess by relative rotation of said two members, said spring having a portion in which the spring-turns are successively spaced radially a greater distance from the wall of said recess as they approach that clutch member to which said spring is operatively connected, whereby relative rotation of said two members in a direction to unwind the spring will cause such spring-turns successively to expand into gripping engagement with the recess wall.

2. In combination, two relatively rotatable members, one of said members being provided with an axial recess, and a coil spring located in said recess and operatively connected to the other of said members, said spring having turns of different diameters, with a group of smaller-diameter turns located axially between turns of larger diameter.

3. The combination set forth in claim 2 with the addition that said smaller-diameter turns successively increase in diameter.

4. In combination, two relatively rotatable members provided in their adjacent faces with alined co-axial recesses, a coil spring located in said recesses, said spring having turns of different diameter with smaller-diameter turns located axially between larger-diameter turns.

5. In combination, two relatively rotatable members provided in their adjacent faces with alined co-axial recesses, a coil spring located in said recesses, said spring having turns of different diameter with larger diameter turns being located near the bottoms of said recesses and smaller-diameter turns being located axially between such larger-diameter turns.

6. In combination, two relatively rotatable members provided in their adjacent faces with alined co-axial recesses, a coil spring located in said recesses, said coil spring being normally of larger diameter at its ends than at an intermediate point, the turns of said spring gradually increasing in diameter from such intermediate point toward one end.

7. In combination, two relatively rotatable members provided in their adjacent faces with alined co-axial recesses, a coil spring located in said recesses, some of the turns of said spring being spaced a greater distance radially inward from the walls of said recesses than are other turns.

8. In combination, two relatively rotatable members, one of said members being provided with an axial recess, and a coil spring located in said recess and operatively connected to the other of said members to be expanded into gripping engagement with the wall of said recess by relative rotation of said two members, said spring having turns of different diameter with smaller-diameter turns located axially between a larger-diameter turn and the point where said spring is operatively connected to said last named clutch member, and clutch-controlling means for operatively connecting said recessed member to one of said larger-diameter spring turns.

9. In combination, two relatively rotatable members, one of said members being provided with an axial recess, and a coil spring located in said recess and operatively connected to the other of said members to be expanded into gripping engagement with the wall of said recess by relative rotation of said two members, said spring having turns of different diameter, and clutch-controlling means for operatively connecting said recessed member to one of said larger-diameter spring turns.

10. The combination set forth in claim 9 with the addition that said larger-diameter spring turns are only slightly smaller than said recess.

11. In combination, two relatively rotatable members, one of said members being provided with an axial recess, and a coil spring located in said recess and having turns of different diameter, said spring being adapted to be expanded into gripping engagement with the wall of said recess and extending in one direction beyond the axial limit of said wall, the extending portion of said spring being operatively connected to the other of said clutch members.

12. In combination, two relatively rotatable members, one of said members being provided with an axial recess, and a coil spring located in said recess and having some turns spaced a greater distance radially inward from the wall of said recess than are other turns, said spring being adapted to be expanded into gripping engagement with the wall of said recess and extending in one direction beyond the axial limit of said wall, the extending portion of said spring being operatively connected to the other of said clutch members.

13. In combination, two relatively rotatable members, one of said members being provided with an axial cylindrical recess, a coil spring located in said recess and adapted to be operatively connected to the other of said members, said spring having a tapered portion in which successive turns gradually increase in diameter toward the bottom of said recess, whereby relative rotation of said two members will cause the spring turns of the tapered spring portion successively to expand into gripping engagement with the recess wall.

In witness whereof, I have hereunto set my hand at Indianapolis, Indiana, this 9th day of June, A. D. one thousand nine hundred and twenty-seven.

WILLIAM CARLETON STARKEY.